(12) United States Patent
Olander et al.

(10) Patent No.: US 7,647,564 B2
(45) Date of Patent: Jan. 12, 2010

(54) SYSTEM AND METHOD FOR DYNAMICALLY GENERATING A GRAPHICAL USER INTERFACE

(75) Inventors: Daryl B. Olander, Boulder, CO (US); Richard Feit, Boulder, CO (US); Edward O'Neil, Boulder, CO (US); Timothy Breeden, Austin, TX (US); Sathyanarayana Giridhar, Sammamish, WA (US); Jason Howes, Somerville, MA (US); Douglas Dew, Champaign, IL (US)

(73) Assignee: BEA Systems, Inc., Redwood Shores, CA (US)

( * ) Notice: Subject to any disclaimer, the term of this patent is extended or adjusted under 35 U.S.C. 154(b) by 354 days.

(21) Appl. No.: 10/789,140

(22) Filed: Feb. 27, 2004

(65) Prior Publication Data

US 2005/0108699 A1    May 19, 2005

Related U.S. Application Data

(60) Provisional application No. 60/450,991, filed on Feb. 28, 2003.

(51) Int. Cl.
*G06F 3/048* (2006.01)
*G06F 3/00* (2006.01)

(52) U.S. Cl. .................. 715/854; 715/762; 715/763
(58) Field of Classification Search .......... 715/854, 715/762, 763
See application file for complete search history.

(56) References Cited

U.S. PATENT DOCUMENTS

| | | | |
|---|---|---|---|
| 5,295,243 A * | 3/1994 | Robertson et al. ........... 715/848 |
| 5,835,712 A | 11/1998 | DuFresne | |
| 6,115,040 A | 9/2000 | Bladow et al. | |
| 6,223,145 B1 * | 4/2001 | Hearst ..................... 703/22 |
| 6,249,291 B1 | 6/2001 | Popp et al. | |
| 6,268,852 B1 | 7/2001 | Lindhorst et al. | |
| 6,327,628 B1 * | 12/2001 | Anuff et al. .............. 719/311 |
| 6,486,895 B1 | 11/2002 | Robertson et al. | |
| 6,778,193 B2 | 8/2004 | Biebesheimer et al. | |
| 7,028,261 B2 | 4/2006 | Smyth et al. | |
| 7,111,243 B1 | 9/2006 | Ballard et al. | |
| 7,117,504 B2 | 10/2006 | Smith et al. | |
| 7,120,897 B2 | 10/2006 | Ebbo et al. | |
| 7,155,678 B2 | 12/2006 | Cooper et al. | |
| 7,203,909 B1 | 4/2007 | Horvitz et al. | |
| 2002/0111922 A1 | 8/2002 | Young et al. | |
| 2002/0188729 A1 | 12/2002 | Zhou et al. | |

(Continued)

OTHER PUBLICATIONS

Hunter, Java Servlet Programming, O'Reilly Copyright 2001, 1998, pp. 1-28.*

(Continued)

*Primary Examiner*—Steven P Sax
*Assistant Examiner*—Andrey Belousov
(74) *Attorney, Agent, or Firm*—Fliesler Meyer LLP

(57) ABSTRACT

A system and method for building a representation of a graphical user interface (GUI), comprising generating a class, generating a first representation of the GUI, wherein the class can produce a second representation GUI based on the first representation, generating a second representation of the GUI from the class, wherein the second representation includes at least one control, and wherein the first representation can include at least one of hierarchical relationships among controls, control properties, and control event information.

42 Claims, 9 Drawing Sheets

U.S. PATENT DOCUMENTS

| | | | |
|---|---|---|---|
| 2003/0014442 | A1 | 1/2003 | Shiigi et al. |
| 2003/0055868 | A1* | 3/2003 | Fletcher et al. ............. 709/201 |
| 2003/0120593 | A1 | 6/2003 | Bansal et al. |
| 2003/0126558 | A1* | 7/2003 | Griffin ........................ 715/513 |
| 2004/0056894 | A1 | 3/2004 | Zaika et al. |
| 2004/0073475 | A1 | 4/2004 | Tupper |
| 2004/0098360 | A1 | 5/2004 | Witwer et al. |
| 2004/0125124 | A1 | 7/2004 | Kim et al. |
| 2004/0133660 | A1 | 7/2004 | Junghuber |

OTHER PUBLICATIONS

Hunter, Java servlet Programming, O'Reilly Copyright 2001, p. 261-267.*

Hunter, et al., "Java Servlet Programming", (c) 2001, 19 pages, 1998 O'Reilly & Associates.

Geary, "Graphic Java, Mastering the JFC", 1999, 24 pages, vol. II, Swing, Sun Microsystems Press.

Schildt, "Java 2: The Complete Reference", 2002, 6 pages, 5th Edition, McGraw-Hill, New York.

Monson-Haefel, Enterprise JavaBeans, 1999, 4 pages, 2nd Edition, O'Reilly & Associates.

Hougland, et al., "Core JSP", 2001, 4 pages, Prentice Hall PTR, Upper Saddle River, NJ.

Moss, "Java Servlets", 1999, 5 pages, McGraw-Hill, New York.

Graham, "The HTML Sourcebook, A Complete Guide to HTML 3.0", 1996, 4 pages, John Wiley and Sons, 2nd Ed.

Knudsen, et al., "Learning Java", May 2000, 48 pages, O'Reilly & Associates, Inc.

Hunter, "JAVA Servlet Programming" 1998, pp. 485-486, (C) 2001, O'Reilly & Associates.

Moss, "Java Servlets", 1999, 26 pages, 2nd Edition, McGraw Hill.

Bontrager, "Creating a Tab Panel", 10 pages, Bontrager Connection, LLP. http://www.willmaster.com/library/tutorials/creating_a_tab_panel.php.

Andersen, "mhtTabPane", 2002, 10 pages. http:users.cybercity.dk/~dsl58854/articles/mhaTab/mhaTabPane.html.

Geary, "Graphic JAVA Mastering the JFC", Sun Microsystems, 1999, 10 pages.

Meckler, "Java and Inter-Applet Communication", Oct. 1, 1997, 11 pages, Dr. Dobb's Journal. retrieved from http://www.ddj.com/java/184410295.

* cited by examiner

```
<%@page
import="com.bea.netuix.servlets.controls.window.WindowPresentationContext,com.bea.netu
ix.servlets.controls.window.TitlebarContext"
%>
<%@ taglib uri="render.tld" prefix="render" %>
<% WindowPresentationContext window =
WindowPresentationContext.getWindowPresentationContext(request);
   TitlebarContext titlebar
      = (TitlebarContext) window.getFirstChild("window:titlebar");
   String expandWidth = "100%";
%>

<render:beginRender>
<div
   <render:writeAttribute name="id" value="<%= window.getPresentationId() %>"/>
   <render:writeAttribute name="class" value="<%= window.getPresentationClass() %>"
      defaultValue="bea-portal-window"/>
   <render:writeAttribute name="style" value="<%= window.getPresentationStyle() %>"/>
   <render:writeAttribute name="width"
      value="<%= window.isPacked() ? null : expandWidth %>"/>
>
<% if (titlebar != null) { %>
   <render:renderChild presentationContext="<%= titlebar %>"/>
<% } %>
   <div class="bea-portal-window-content">
</render:beginRender>
<render:endRender>
   </div>
</div>
</render:endRender>
```

Figure 9

SYSTEM AND METHOD FOR DYNAMICALLY GENERATING A GRAPHICAL USER INTERFACE

CLAIM OF PRIORITY

This application claims priority from the following application, which is hereby incorporated by reference in its entirety:

U.S. Application No. 60/450,991, Framework For A PERSONALIZED PORTAL, Inventors: Daryl Olander, et al., filed on Feb. 28, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following co-pending applications which are each hereby incorporated by reference in their entirety:

U.S. application Ser. No. 10/788,803, Inventors: Scott Musson, et al., filed on Feb. 27, 2004, SYSTEM AND METHOD FOR CONTAINING PORTLETS.

U.S. application Ser. No. 10/788,530, Inventors: Scott Musson, et al., filed on Feb. 27, 2004, METHOD FOR ENTITLING A USER INTERFACE.

U.S. application Ser. No. 10/789,970, Inventors: Daryl B. Olander, et al., filed on Feb. 27, 2004, GRAPHICAL USER INTERFACE NAVIGATION METHOD.

U.S. application Ser. No. 10/788,876, Inventors: Scott Musson, et al., filed on Feb. 27, 2004, METHOD FOR PROVIDING A GRAPHICAL USER INTERFACE.

U.S. application Ser. No. 10/789,137, Inventors: Daryl B. Olander, et al., filed on Feb. 27, 2004, METHOD FOR UTILIZING LOOK AND FEEL IN A GRAPHICAL USER INTERFACE.

U.S. application Ser. No. 10/788,801, Inventors: Scott Musson, et al., filed on Feb. 27, 2004, METHOD FOR PORTLET INSTANCE SUPPORT IN A GRAPHICAL USER INTERFACE.

U.S. application Ser. No. 10/789,135, Inventors: Daryl B. Olander, et at., filed on Feb. 27, 2004, CONTROL-BASED GRAPHICAL USER INTERFACE FRAMEWORK.

U.S. application Ser. No. 10/789,137, Inventors: Daryl B. Olander, et al, filed on Feb. 27, 2004, METHOD FOR PROPAGATING LOOK AND FEEL IN A GRAPHICAL USER INTERFACE.

BACKGROUND

Developing graphical user interfaces (GUIs) for distributed applications such as web portals can present many challenges. Not only do end-users expect to customize the content a given GUI presents to them, they might also expect to customize the look and feel of the GUI. Such customization can be coarse-grained, as in changing an overall color scheme, but they can also be fine-grained wherein an end-user may desire to change the textures, arrangement, behaviors and other characteristics of the GUI. This presents many design challenges, especially if such a GUI is deployed in a clustered, multi-threaded runtime environment.

FIELD OF THE DISCLOSURE

The present disclosure relates generally to graphical user interface development.

BRIEF DESCRIPTION OF THE DRAWINGS

FIG. 9 is a sample skeleton JavaServer Page in accordance to an embodiment.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
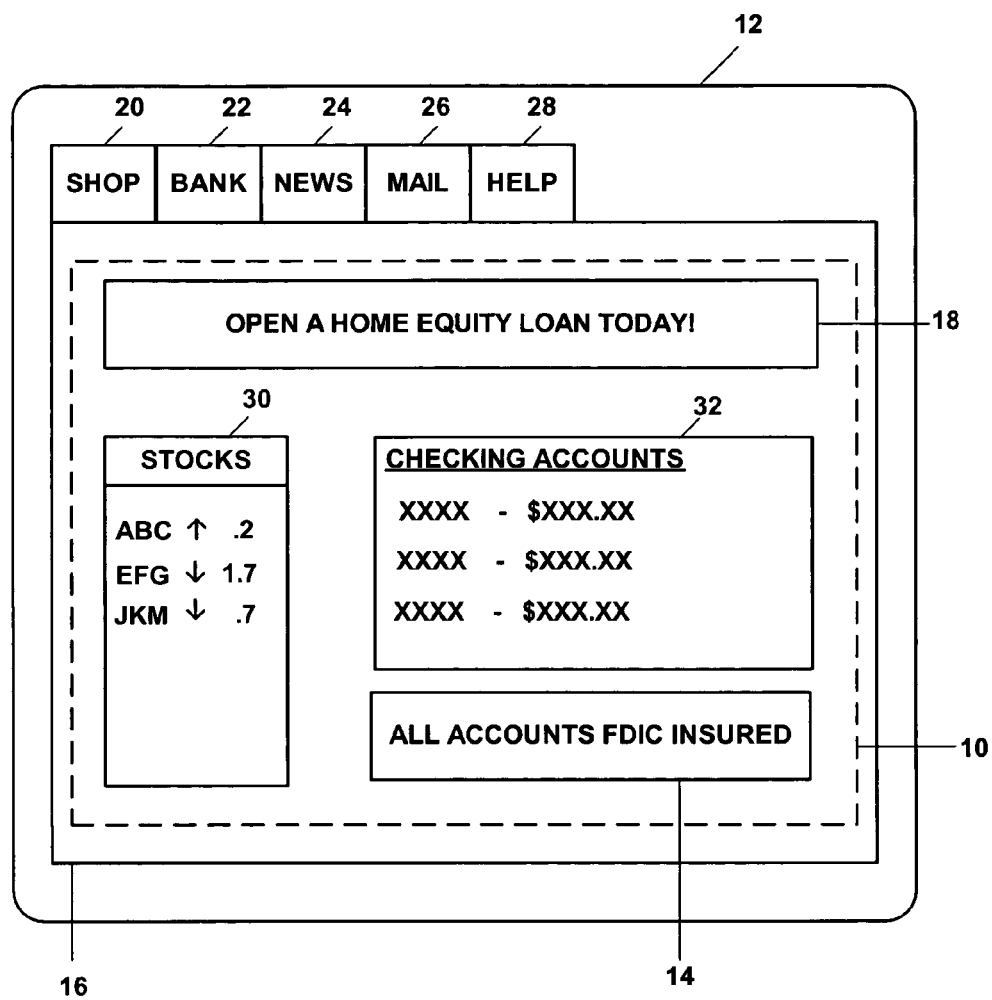
FIG. 1 is an illustration of an exemplary web graphical user interface in accordance to an embodiment.

FIG. 1 is an illustration of an exemplary web graphical user interface in accordance to one embodiment of the invention. In one embodiment, by way of example, page 16 is rendered upon display area 12, which can be a region in the display area of a device for displaying images and/or producing sounds (e.g., a computer monitor). Page 16 is comprised of several elements. Page selection tabs 20-28 can each be selected by a user to render a different page. Pages can be thought of as panels or panes that can be swapped into and out of a display region of the available portal real estate. By way of a non-limiting example, selection of a GUI element can be accomplished with an input device such as a mouse, a motion detector, voice commands, hand or eye gestures, etc. If tab 20 were selected, for example, the page corresponding to that tab could be rendered. Although the tabs 20-28 in FIG. 1 are displayed horizontally, in another embodiment the tabs could be displayed vertically or using some other suitable scheme such as a hierarchical menu.

Within page 16 is display area 10, which includes portlets (18, 30, 32) and other elements. A portlet is an application that manages its own GUI. Portlets can communicate with each other and with other software and hardware components (e.g., Enterprise Java Beans™, Java™ Beans, servlets, applets, etc.). The Java™ programming language, its libraries, environment, and toolkits are available from Sun Microsystems, Inc. of Santa Clara, Calif. The other software and hardware components may be part of the same execution environment as the portlet or may be in a different execution environment. In one embodiment, a portlet can be implemented with JavaServer Pages™. By way of a non-limiting example, portlet 30 displays real-time stock ticker information. A user could configure such a portlet to display certain stocks, for example. In another embodiment, the user can select a given stock displayed in portlet 30 and receive more detailed information, such as the price history, price to earnings ratio, etc.

Portlet 30 can handle user input and responding accordingly. Portlet 32 displays up-to-date information pertaining to a user's checking accounts. Likewise, portlet 32 could provide detailed information on transactions if the user were to select an account. Advertisement portlet 18 displays an advertisement that could be directed specifically to the current user based on demographics or other information. For instance, if a user had an outstanding home loan in good standing, the advertisement could be for a home equity loan. Likewise, if the user had an appropriate amount in a savings account, the advertisement could be for a new car loan. Static area 14 contains text or an image with text.

Figure 2:
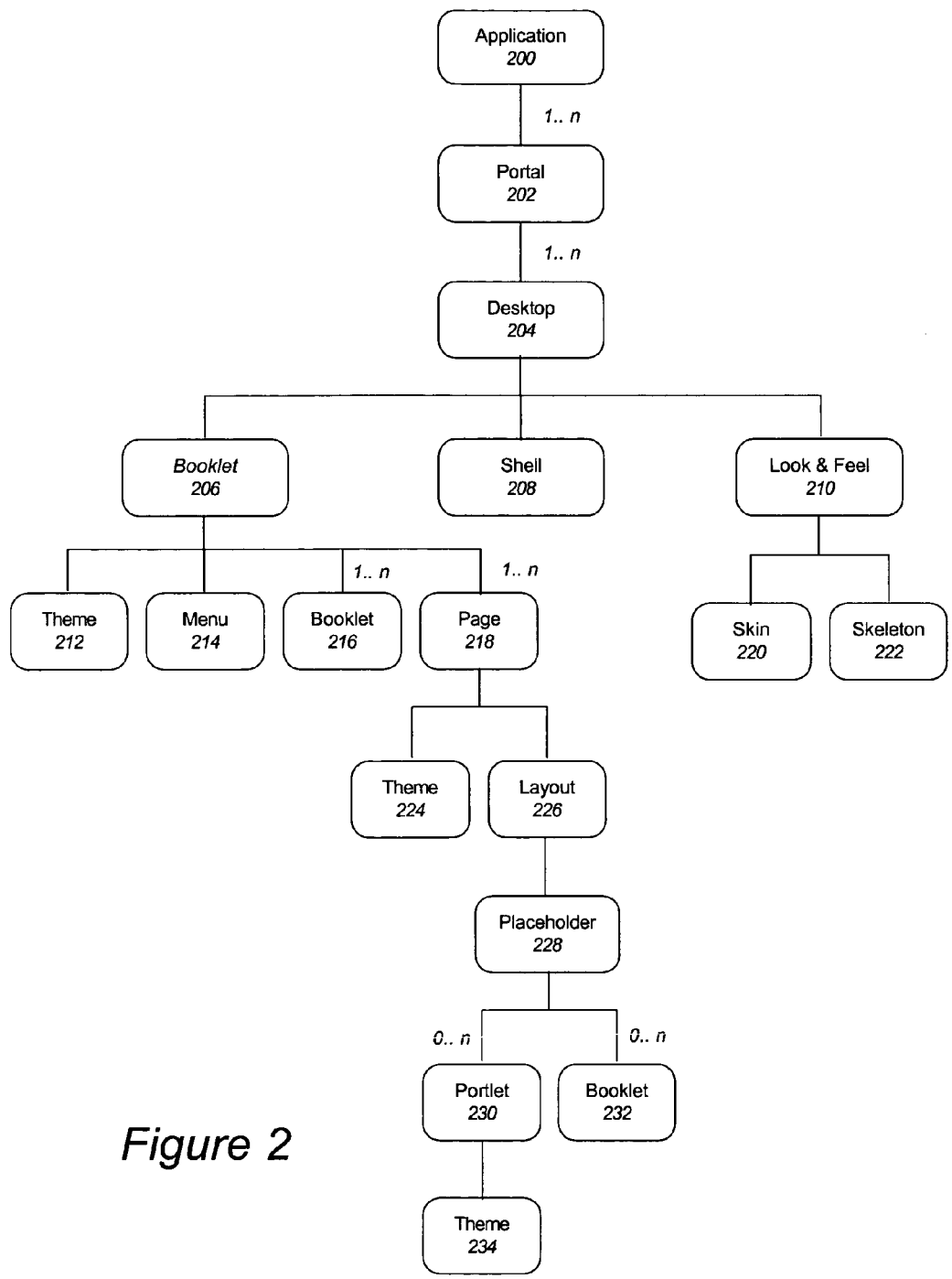
FIG. 2 is an illustration of a web control taxonomy in accordance to an embodiment.

FIG. 2 is an illustration of a control taxonomy in accordance to an embodiment. One embodiment provides a set of controls that represent corresponding graphical and functional elements in web applications. Controls can have properties that can be read and set, and controls can interact with each other through an event notification mechanism. In addition to properties and events, controls can also have methods which provide services and which may be overridden to provide specialization of the control. In one embodiment, a control can be implemented as one or more classes in an object-oriented programming paradigm. Such an arrangement allows for new properties, events and/or specialized control methods to be provided by extending base control classes related to these features. In a framework, controls can also serve as containers for other controls. By way of a non-limiting example, a page may contain a booklet and a portlet, the booklet may contain one or more pages, the portlet may contain a window, the window may contain a title bar which may contain a close button, etc.

At the top of the taxonomy, there can be one or more web applications 200. A web application represents a collection of resources and components that can be deployed as a unit in one or more web/application servers. In one embodiment, a web application can represent a J2EE (Java 2 Platform, Enterprise Edition) Enterprise Application. In various embodiments, a web application can contain one or more controls 202 representing one or more portals. From an end-user perspective, a portal is a website whose pages can be navigated. From an enterprise perspective, a portal is a container of resources and functionality that can be made available to end-users. Portals can provide a point of access to applications and information and may be one of many hosted within a web/application server. In one embodiment, a portal can be a J2EE application consisting of EJB (Enterprise Java Bean) components and a set of Web applications. In another embodiment, a portal can be defined by an XML (Extensible Markup Language) file. The portal file can contain all of the components that make up that particular instance, such as booklets, pages, portlets, and look and feel components.

A GUI can contain one or more desktop controls 204. A desktop control in turn can contain one or more personalized views or user views (not shown). A user can have one or more personalized user views of a desktop. In one embodiment, a user view can result from customizing the layout, content, number, and appearance of elements within a desktop. A default user view can be provided for users who have not yet customized a desktop. A desktop's appearance can be determined by a Look and Feel control 210. The look and feel control can contain a skin component 220 and a skeleton component 222. Skins can provide the overall colors, graphics, and styles used by all components in a desktop interface. In one embodiment, skins can include collections of graphics and cascading style sheets (CSS) that allow changes to be made to the look and feel of the GUI without modifying other components directly. References to images and styles can be made in the skin rather than being hard-coded into a GUI definition. A look and feel component can provide a path to a skin directory to be used.

The look and feel file can also provides a path to the skeleton directory to be used. Every type of component, from a desktop to a portlet's title bar, can have an associated JSP (Java ServerPages™) file, called a skeleton file, that renders it. For example, each desktop uses a skeleton file called shell.jsp that simply provides the opening and closing <HTML> (Hypertext Markup Language) tags to render the desktop. A portlet title bar, on the other hand, can have a skeleton file called titlebar.jsp that is more complex. It contains Java calls to various windowing methods in the API, references the button graphics to use on the title bar, and determines the placement of title bar elements with an HTML table definition.

A desktop also can contain a booklet control 206. A booklet control represents a set of pages linked by a page navigator (menu 214) having a user selectable graphical representation (e.g., a series of tabs wherein each tab corresponds to a different page, a series of buttons, a menu, or other suitable means.) A booklet can provide an indication of the currently selected page through visual clues such as highlighting a currently selected tab, displaying text and/or graphics to indicate the current page, etc. Booklets can be nested to n levels. A booklet can optionally include a theme control 212. In one embodiment, a theme control represents a subset of a skin component and can provide a way of using a different set of styles for individual desktop components. The booklet control can also contain other booklets 216.

A shell control 208 can render anything surrounding the booklet 206 in the desktop 204. For example, a shell control might render a desktop's header and footer. These areas usually display such things as personalized content, banner graphics, legal notices, and related links.

A booklet also contains zero or more page controls 218. A page control can represent a web page in an embodiment. A page is an area of a GUI upon which other elements having GUIs, such as booklets and portlets, can be placed. Pages can also contain booklets and other pages, and can be identified/navigated to by a control such as a menu 214. A page control can also hold a theme control 224 and a layout control 226. A layout control determines the physical locations of portlets and other elements on a page. In one embodiment, a layout is can be implemented as an HTML table.

A layout can contain a placeholder control 228 which is comprised of individual cells in a layout in which portlets are placed. A placeholder can contain zero or more booklets 232 and zero or more portlets 230. A portlet is a self-contained application that can render its own GUI. A portlet is a self-contained application that is responsible for rendering its own content on a page. By way of a non-limiting example, a portlet might be a display of current news headlines, wherein if a user selects a headline the portlet retrieves and the underlying story and displays it for the user. Portlets can communicate with other portlets and with back-end processes such as legacy software, databases, content management systems, enterprise business services, etc. In addition, multiple instances of a portlet can execute simultaneously. A portlet can also contain a theme 234.

A control tree can represent a particular instance of the control taxonomy. In one embodiment, each node in the control tree can be a subclass of a Control class in an object-oriented paradigm. A control tree can be created with both statically created controls and dynamically created controls. Statically created controls are created during a construction (or "wire-up") phase of the control tree and, in one embodiment, can be based on static markup. Dynamically created controls are created during a control tree lifecycle, many times in reaction to state, context, and events. Both kinds of controls can create content either dynamically (e.g., by binding to a database table) or statically (e.g., by containing a literal string).

Controls within a control tree can have unique names. In addition, controls can have local names that are qualified into a scope. This can allow for controls to be searched for based upon their "local" name within a naming scope. In one embodiment, the system can use a control's unique name for identifying it in operations such as saving and restoring state during the cycle of HTML postbacks to the page. Postback occurs when a form on a page targets the same page. When the form is submitted, the second request for the page is called a postback. The postback allows the page to handle changes made to data and raise events before either redirecting to a new page or simply displaying the same page again. In one embodiment, multiple control scopes can be provided as described in Table 1.

TABLE 1

Object Scopes in an Embodiment

| SCOPE | DESCRIPTION |
|---|---|
| Request | An object is accessible for the life of the request. |
| Page | An object is accessible across subsequent requests to a page. In one embodiment, a page has a lifetime that can include a postback cycle. |
| Session | An object is accessible for the life of the session. (This is available for protocols that support session.) |
| Webflow | An object is accessible within a named scope defined by a webflow. A Webflow is a set of states that control navigation from one web page to another. |
| Application | An object is accessible globally within the application. |

In one embodiment, many of the classes can be sub-classed to provide specializations and custom features. It will be apparent to those skilled in the art that many more such classes are within the scope and spirit of the present disclosure. Table 2 provides an overview of classes in one embodiment.

TABLE 2

Framework Controls in an Embodiment

| CLASS/INTERFACE | DESCRIPTION |
|---|---|
| Control | The basic framework building block. The base Control class defines a set of services available to all controls. This class defines and provides a set of services to subclasses including lifecycle, naming, and child management.<br>A lifecycle driver will drive the control-tree through a well defined set of states. For a control, the lifecycle is defined by a set of methods representing stages in the lifecycle. A control can override methods of the lifecycle in order to provide specialized behavior. For example, most controls will override beginRender to render its specific representation to an output stream. The stages provide well defined places to acquire resources, manage state, raise events, render themselves, etc. Most lifecycle stages consist of two methods that are called by the lifecycle driver. The naming pattern of the two methods is Xxxx and fireXxxx. The Xxxx method is overridden by subclasses to specialize the lifecycle stage. The fireXxxx method is overridden if a control wants to change how the event associated with the lifecycle stage is fired. |
| Lifecycle | Defines methods called during the control's lifecycle. There are two methods for most lifecycle events. The lifecycle method xxx is called first to provide the lifecycle service for the control. Then an onXxx method is called to raise an event. In one embodiment, all of the lifecycle stages prior to rendering raise events through the onXxx method. |
| NamingScope | The Control and the NamingScope interface interact to provide support for uniquely naming a control within a tree. Unique names are generated automatically when controls are added to an existing control-tree. Unique names are used for state management. Controls have three types of names:<br>Id - This is a user assigned value that should be unique within a name scope.<br>ScopeId - This is a generated name that is unique within a scope. It is either the Id or a generated name.<br>UniqueId - This is the globally unique name of the control. This name is typically used to identify state and identify the control within a HTML Form. |
| Context | Context is an abstract class providing services to controls in the tree. In one embodiment, these services are protocol-independent. It is the container's responsibility to create the context object. The container can create an object that subclasses Context and provides container aware controls with |

TABLE 2-continued

Framework Controls in an Embodiment

| CLASS/INTERFACE | DESCRIPTION |
| --- | --- |
| | additional services such as information about the framework and or protocol.<br>By way of a non-limiting example, a container can be a servlet providing a framework. The Context can contain both HTTP-specific information and web application-specific information. A Portlet control that is portal-aware can cast the Context into the subclass and access these services. Well-designed controls, which are aware of one or more containers, can be written to work or fail gracefully when they are used within the context of the generic Context.<br>Context provides the following services:<br>Access to the Abstract Data Layer - Context will provide an object implementing the interface providing an abstract data layer.<br>Request Type - The Context contains properties indicating what type of request is happening such as "new request", "postback", etc.<br>Request Information - The Context provides information that comes from the request such as request parameters, requested URL, etc. This information may be unavailable for protocols that don't support it.<br>Generic Services - The context allows controls to access and register as service providers to other controls. For example, a StyleBlock control may register as the StyleHandler object that will create a single style sheet for an output HTML document. Other controls may push style definitions into the StyleHandler. These services will typically be used by a set of framework aware controls and will support things such as styles, URL rewriting, etc. |
| Renderer | Renderer is an interface that allows a class to be created and which acts as a rendering proxy for a control. A control has rendering methods allowing the control to output its representation into a stream. There are two primary methods for rendering; beginRender( ) and endRender( ). Default rendering can be overridden by setting a control's renderer by providing an object implementing the Renderer interface. |

Figure 3:
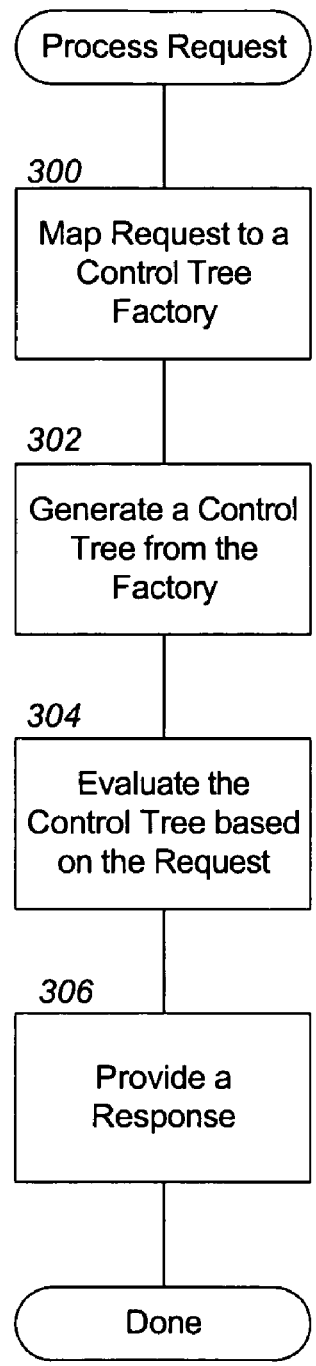
FIG. 3 is an illustration of request processing in an embodiment.

FIG. 3 is an illustration of request processing in an embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In one embodiment, a GUI is rendered in response to a request (e.g., an HTML request originating from a web browser). In step 300, a process (e.g., a web/application server or other suitable process) can accept the request and map it to a control tree factory. In step 302, the identified factory can be used to generate a control tree representing the GUI. In step 304, the control tree can be evaluated based on the contents of the request. In doing so, the control tree can be driven through a sequence of lifecycles that allow for individual controls in the tree to, by way of a non-limiting example, process the request, interact with each other and a context provided by the container, and produce a response. Finally, in step 306 the process can provide a response to the sender of the request. In one embodiment, this response can contain output for GUI rendering (e.g., HTML or other suitable GUI description) from one or more controls.

In one embodiment a container (not shown) can run the control tree through a sequence of one or more lifecycles by employing the services of an interchangeable lifecycle driver (not shown). In one embodiment, a control or a container can customize the lifecycle. Customization can include removing and/or reordering defined lifecycle stages and/or adding new stages. All of the controls in the control tree can participate in the lifecycle, but do not have to. The purpose of the lifecycle is to advance the control tree though a set of states. These states permit controls to obtain their state and resources, raise and handle events, save their state, communicate with other controls, render themselves, and free resources. The lifecycle is external to the control tree and can be provided by the container. This allows for easy modification of the lifecycle.

In one embodiment, controls can register to raise and catch events to perfect inter-control communication. An event mechanism allows controls to specify (or register for) events that they will raise and/or listen for. In one embodiment, this can be accomplished with two methods. A method named "xxxx" represents the lifecycle method itself and is usually sub-classed to provide specialized behavior for the control. A method named "fireXxxx" can be invoked to cause an event notification that the lifecycle method xxxx has run on the control. This method can be overridden to provide specialization of event firing. By way of a non-limiting example, a control could suppress firing of an event by overriding it and doing nothing. When an event is raised, all controls that have registered to receive it will be given an opportunity to handle the event (e.g., through a call-back mechanism). There is no limit on the number of events that can be raised or caught. By way of a non-limiting example, a form control could raise an event when a user enters text in a text field of a GUI representation of the form. This event could be caught by a button on the same page as the form. The button could then un-dim itself based on a determination of whether a user entered a valid character sequence into the form.

Controls can be dynamically added to the tree at any stage of the lifecycle up until a pre-render stage. When controls are added to an existing tree dynamically, these new controls can participate in the full lifecycle. In one embodiment, a lifecycle catch-up process can drive the new controls through the lifecycle until they catch-up to the current stage. All lifecycle stages before the rendering stage can raise events. In one embodiment, a container can implement the lifecycle stages illustrated in Table 3.

TABLE 3

Lifecycle Stages in an Embodiment

| LIFECYCLE STAGE | DESCRIPTION |
| --- | --- |
| Init | Allows a control to perform initialization. |
| Load State | Load previously saved state from the request. This state represents the GUI state of the page. |
| Create Child Controls | Stage used to create child controls. |
| Load | Obtain external resources necessary for processing the request. If the request is a postback, at this point the controls' states match their states in the client's view, i.e., saved state has been restored and postback data has been used to update controls with new values. |
| Raise Events | This is a two phase stage where controls first indicate they want to raise events and then all controls who indicated this are allowed to raise events. |
| Pre-render | This is the final stage before the rendering stages. At this point the tree should be stable and all events processed. |
| Save State | This stage is the first stage in rendering. All controls that want to save their states are given the opportunity to do so. Any changes to controls after this point cannot affect the saved state. This is the page specific GUI state. Application level state is managed at a different level. |
| Render | This is the stage where controls create their GUI representations and control how their children are rendered. |
| Unload | This stage allows the control to free resources obtained in Load. |
| Dispose | Any final cleanup can be done. |

Figure 4:
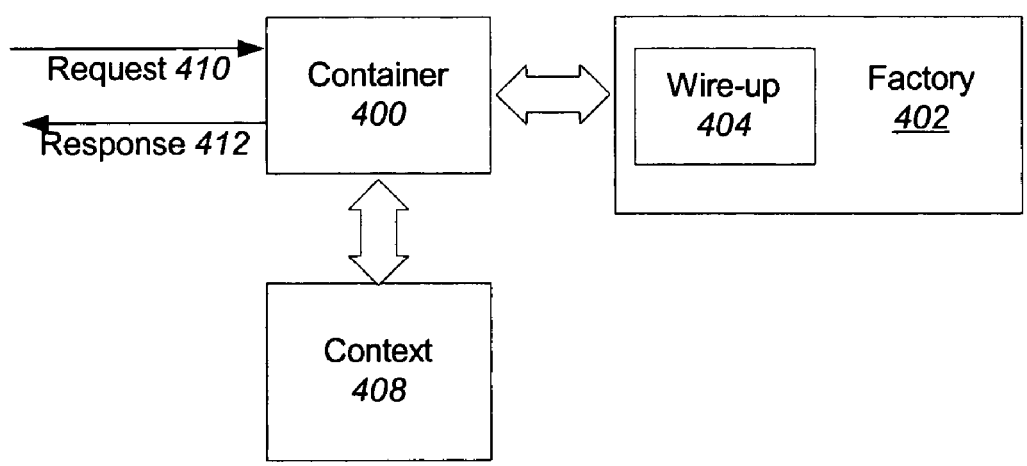
FIG. 4 is diagram of container processing in accordance to one embodiment.

FIG. 4 is diagram of container processing in accordance to one embodiment. Although this diagram depicts objects/processes as functionally separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks.

A request 410 can be mapped to a control tree factory 402 by container 400. In one embodiment, the container use "wire-up" service 404 in the factory which will cause the factory to return the root of a control tree. In one embodiment, the generation of the control tree is based in part on the request. The control tree (not shown) produced by control tree factory can be a page level object or can become a sub-tree of a larger control tree. The control tree factory is independent of container 400 and can be accessed from multiple containers. In one embodiment, the control tree factory can make modifications to the tree such as replacing the default rendering or state methods for a control, including for the page itself. In one embodiment, the container can associate a Context object 408 with the control tree root. A base Context class can provide generic services to controls in a control tree and can be protocol independent. Generally speaking, a container can be associated with both a specific protocol and application framework. However, the container can also provide a subclass of Context to expose protocol and application-specific objects and services.

Figure 5:
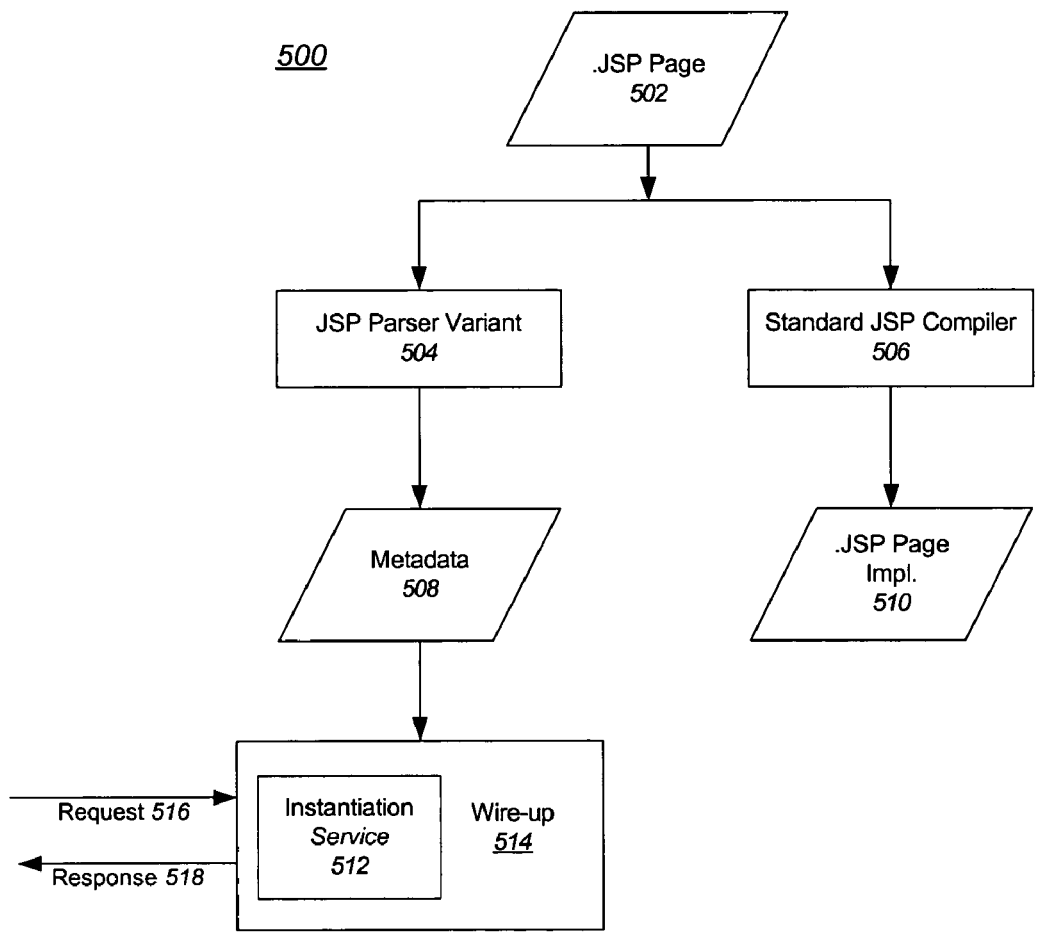
FIG. 5 is diagram of a control tree factory having a JSP page description implementation in accordance to an embodiment.

FIG. 5 is diagram of a control tree factory having a JSP page description implementation in accordance to an embodiment. Although this diagram depicts objects/processes as functionally separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks.

In one embodiment, the framework can support JSP as a page description language. The control tree produced by such an implementation can allow for full use of JSP features such as tag extensions, scriptlets and expressions. By way of a non-limiting example, a servlet mapped to the extension ".jsp" can handle all JSP pages 502 mixing JSP and controls and can act as a container. The servlet can provide a request 516 to factory 500, which will generate a control tree. The factory can use a JSP parser variant 504 to create a metadata representation of a control tree 508. The parser variant captures the hierarchy of controls and for each control it recognizes, it can also capture information about the properties, events, and model binding that have values set in the page description. The parser variant can also capture template text in the JSP page and create metadata representing the template text as literal controls. By way of a non-limiting example, tag library extensions can represent controls in the JSP page. A standard JSP compiler 506 can also process the .JSP page and produce a .JSP page implementation class 510 that can be used to render JSP in concert with the control tree.

A class 514 is created to process the metadata. The class provides a service 512 that can be used to instantiate a control tree on behalf of a container. If the JSP page contains JSP-specific features, the service can make use of an inner class that implements a Renderer interface (not shown). The Renderer interface can act as a proxy for rendering of the control tree. In one embodiment, this proxy defers to a _jspService( ) method found in the JSP page implementation class. The Renderer interface treats the page implementation class as a servlet and drives it through the lifecycle, providing it a servlet context and other things needed. Tag extensions can be mapped into the control tree during the render lifecycle. The variant parser can create literal controls in the control tree for instances of template data found in the JSP page. In one embodiment, if a JSP page contains only controls and template data, the _jspService( ) method does not to be invoked.

Figure 6:
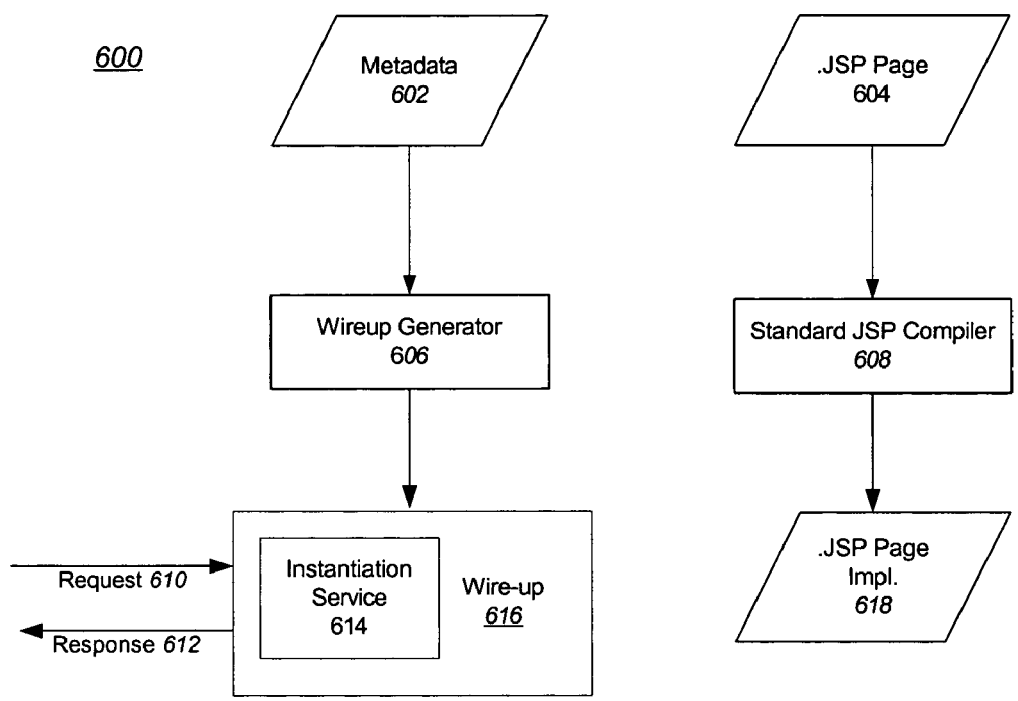
FIG. 6 is diagram of a control tree factory having a metadata page description implementation accordance to an embodiment.

FIG. 6 is diagram of a control tree factory having a metadata page description implementation accordance to an embodiment. Although this diagram depicts objects/processes as functionally separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks.

Referring to FIG. 6, a parser is not relied upon to generate metadata describing a control tree. Instead, a metadata representation 606 is assumed to be available as a resource 602 to the factory 600. In one embodiment, the metadata representation can be an XML document or Java class file defined by a schema. The factory has an internal wire-up generator 606 that can generate a control tree wireup class 616 based on the metadata. In this scheme, the rendering can be performed by a Renderer object (not shown) that can defer to a _jpservice( ) method available in the JSP page implementation 618, depending on the metadata. In one embodiment, the JSP page implementation is produced by a standard JSP compiler 608.

Figure 7:
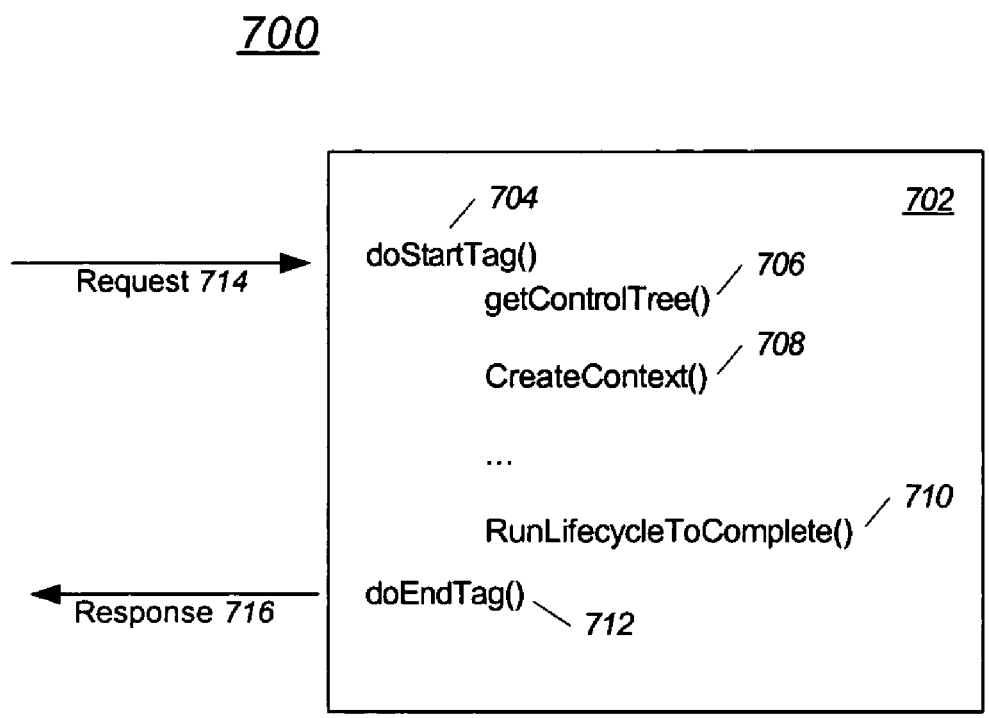
FIG. 7 is diagram of a control tree factory having a pure JSP page description implementation accordance to an embodiment.

FIG. 7 is diagram of a control tree factory having a pure JSP page description implementation accordance to an embodiment. Although this diagram depicts objects/processes as functionally separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks.

In one embodiment, JSP container 700 drives the control tree instantiation process with help from a tag library extension that acts as a container of state set on tag attributes that can be pushed into control instances that the tags create. In one embodiment, this process can be demarcated in a page description file 702 with a pair of tags 704 and 712. One or more tags 706 can locate the metadata description of the control tree and create the control tree. Other tag(s) 708 can create a context for the control tree and drive it through its lifecycle 710 to the render stage. The container then allows its body content to render the page. Then, tag 712 can drive the final portions of the lifecycle.

JSP input can also be supported. One embodiment can utilize a backing file in addition to the JSP file. The backing file can be a Java class that lives beside the JSP file and contains two types of customizations: 1) overloaded method and event handling logic; and 2) declarations for all controls inside the control tree that have an identification property set. Code can be written in overloaded methods such that an event handler has access to these controls. The JSP page extends a Backing class, which gives the wire-up method the ability to use the JSP implementation class as the root of the control tree. The wire-up method can also insure that the declared controls are initialized and that event handlers are wired up. In one embodiment, the variant JSP parser may produce the backing file within the code generated to wire up the tree. The wire up can initialize variables in the backing file and wire-up handlers.

In yet another embodiment, all input can be derived from a JSP file. Code to handle events can be declared (e.g., "< % ! . . . % >") directly in the JSP file as a method. The wire-up process would insure that the proper method would be called. The same could be done for the control variable declarations. In many cases, these declarations would not be written and a Model object would act as an event handler. Thus, one can override methods on control and handle events in this way.

Figure 8:
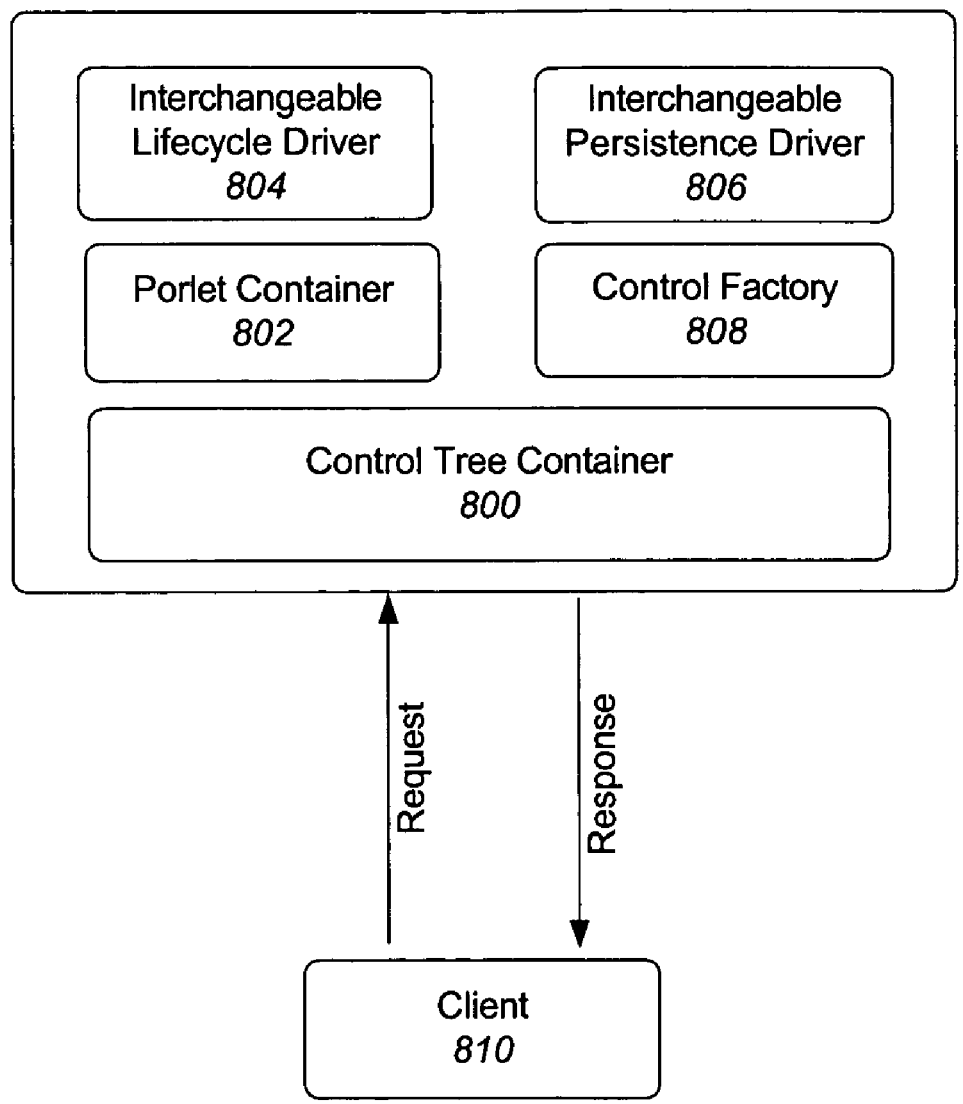
FIG. 8 is a diagram of a system in accordance to an embodiment.

FIG. 8 is a diagram of a system in accordance to one embodiment. Although this diagram depicts objects/processes as functionally separate, such depiction is merely for illustrative purposes. It will be apparent to those skilled in the art that the objects/processes portrayed in this figure can be arbitrarily combined or divided into separate software, firmware or hardware components. Furthermore, it will also be apparent to those skilled in the art that such objects/processes, regardless of how they are combined or divided, can execute on the same computing device or can be distributed among different computing devices connected by one or more networks.

Referring to FIG. 8, a control container 800 interacts with a client 810 through a request and response protocol. The control container can accept requests from the client and provides responses thereto so that the client may refresh its GUI based on any processing inherent in the request. The control container can map a request to a control factory 808 which it will use to generate a control tree representation of the client GUI (not shown). Controls in the control tree can make use of a persistence interface that acts as a front-end to an interchangeable persistence driver 806. The persistence interface hides persistence implementation details from controls and allows for a flexible architecture where different persistence providers can be "plugged in" as needed. The control container can use an interchangeable lifecycle driver 804 to drive the control tree through a sequence of states so that the request can be processed. As with the interchangeable persistence driver, an interface is provided to isolate lifecycle driver implementation details from the control container. This allows for different lifecycle implementations to be interchanged as needed. One or more portlet containers 802 are provided to support portlet execution for those controls in the control tree that have associated portlet processes/servlets.

Controls have the ability to persist state across HTTP (Hypertext Transfer Protocol) requests. A state management API can be provided to give each control in the tree the ability to persist itself before rendering an HTTP response. When an HTTP submit to the same page is received, this saved state can be used to re-hydrate or restore the control tree from its persisted state. Thus, the same state can be maintained across different instances of the same control tree with minimal effort to the control author. Controls can be persisted using a state management persistence mechanism.

The Context object can provide access to an interface providing an ADL (Abstract Data Layer). The ADL can provide a named binding to objects within a specific scope support for object activation and creation, caching, named access, etc. The framework can define a binding language that can be used to bind properties on controls to properties on objects.

In one embodiment, state management can be implemented behind a pair of interfaces: ClientStateWriter and ClientStateReader. The ClientStateWriter provides an interface that a control can use to write any primitive type or object into state management. By way of a non-limiting example, the following methods can be exposed:

```
public void writeByte(byte b);
public void writeShort(short s);
public void writeString(String s);
public void writeObject(Object o);
```

At a particular stage in the control tree lifecycle, the control has the opportunity to save its state. In one embodiment, when a control calls a saveState( . . . ) method, the control receives a ControlStateWriter object into which it can write its state. A control's contract with state management is that on the page's next submit, the control can re-read this state using the corresponding loadState( . . . ) lifecycle method. A control can read the state in the same order in which the state was written. By way of a non-limiting example, state can be read by using methods defined on the ControlStateReader interface such as:

```
public byte readByte( );
public short readShort( );
public String readString( );
public Object readObject( );
```

A control is aware only that it is receiving an interface against which to save any of its state. How the state is actually written and where it is stored are left as implementation details to the implementer of the state management. One approach to state management may be to write the state into a web page and have the state submitted whenever a form from the page is submitted. This approach suffers from problems when the amount of state that is written to the browser is large, though it may keep the server from having to track large and expensive user session objects. The flexibility of this embodiment is that a web application and even a page can be configured to use a particular state management policy for state that a control tree has written into a ControlStateWriter. The resulting state could be stored in the client, as mentioned, the database, a cache system, or even the user session. In one embodiment, state can be written to a page as a hidden field found in a form.

In one embodiment, a state management implementation consists of a ControlStateWriter that writes to a byte array that is Base64 encoded and written to the browser in an input tag within a form tag. When the form is submitted, the state string is contained in the request data and is used to create a ControlStateReader that contains the data for each control. ControlStateReaders can also be chained such that the container can find a ControlStateReader for a particular control instance from any number of locations that may be in a state reader chain. A reader chain is specified with a list of implementations in an external XML file that is parsed at runtime.

The organization of controls in a tree can also be persisted. In one embodiment, it is assumed that some language (e.g., JSP, XML, etc.) can be used to describe the control tree and that control tree factory can process this language and return a representation of the tree. In one embodiment, the language can describe metadata about the control tree, the hierarchical relationship between controls, property/value pairs for controls in the tree, and event handling. In one embodiment, the language can be manipulated as a stream by the framework. A so-called streaming control tree can plug into the framework by implementing a control tree factory.

In one embodiment, a streaming control tree factory creates a control tree from an XML Stream. By way of a non-limiting example, the XML stream may be obtained from multiple sources including the file system, a database, a dynamically constructed Document Object Model (DOM) Tree, etc. In one embodiment, a streaming control tree factory first parses an XML document representation of a control tree into a DOM Tree. The XML document can conform to one or more known schemas which define how a control tree is described. The DOM tree is then processed to create a representation of the control tree. When the streaming control tree factory is asked for an instance of the control tree, the factory will create a new instance of the control tree from the representation.

In one embodiment, after an initial control tree is created, Java Serialization can be used to obtain a serialized (or streamed) view of the control tree. When an instance of the streaming control tree is requested from a control tree factory, the serialized view is deserialized. In another embodiment, Java™ code generation can be used to create a class that will create the control tree. In this embodiment, Java™ code is that knows how to create and initialize the control tree is generated. When a streaming control tree is requested from the factory, the compiled version of Java™ code is executed to obtain the control tree.

In order to increase the performance of controls that use long-running resources such as EJBs (Enterprise Java Beans), database accesses or external site content, portions of the control lifecycle can be modified to support running subtree lifecycles in parallel. By way of a non-limiting example, assume there are two controls, A and B, each which rely on using a long-running resource in their lifecycles. Standard serial lifecycle traversal over these controls will result in total run time greater than the sum of the run times of the long-running resources. However, if these two controls could be run in separate threads, it is likely that the overall runtime will be less than in the serial case.

In one embodiment, two variations of multithreading are enabled for controls: preRender multithreading and render multithreading. PreRender multithreading is the simplest of these, while render multithreading is probably the more useful for the most common performance needs (e.g., where external site content is included into the final control tree output).

In one embodiment, a multithreaded foundation is shared between the two multithreading variations. This foundation includes a ControlTreeWalkerPool class. This class is used to spawn off ControlTreeWalker invocations to process each thread of processing control. Additionally, this class can perform accounting and synchronization of the spawned workers. When a new worker is created and dispatched, a count can be incremented of the workers still performing tasks. At the completion of a task, a worker can decrement the count. The main calling thread can then use the ControlTreeWalkerPool to wait until all workers have completed their tasks before continuing processing a Lifecycle run.

The ControlTreeWalkerPool can internally use instances of WalkerWorkers, specialized to the type of multithreading to be done. A factory can be used to instantiate a specific type of WalkerWorker, after which a set of thread context information is gathered, including the ContextClassLoader and Subject associated with the mainline thread. The assignment and execution of the tasks for a WalkerWorker is performed using the Weblogic kernel facilities for running ExecuteRequests on threads obtained from ExecuteThreadPools. In this case, the each WalkerWorker implements the ExecuteRequest interface, allowing it to be dispatched to a WLS ExecuteThread.

Once a WalkerWorker has been dispatched to an ExecuteThread, it performs two additional steps before the actual control tree walk is performed. First, a ContextClassLoader is transferred to the ExecuteThread. Then, a WalkerWorkerPrivilegedAction class object, which implements a PrivilegedExceptionAction, is created and invoked on the current thread using a Subject saved from the mainline thread. This privileged action is then used to perform a Security.runAs( ) method so that the WalkerWorker task is performed with the same user security privileges as in the mainline thread. At this point, code specific to the type of WalkerWorker is executed via a default pattern, where concrete WalkerWorker classes implement the WalkerWorker method executeWalkerWorker.

Multithreaded preRender is useful in cases where a control can perform the long-running portion of its processing without the need to immediately render its results into the response. This might include cases where EJB's are called or long-running computation is done, the results of which are then saved for use in the render lifecycle phase. The multi-threaded preRender implementation is composed of two pieces: a class called LifecycleWorker, which extends WalkerWorker, and a modified version of the ControlTreeWalker's walkRecursive( ) method called walkRecursivePreRender( ).

In one embodiment, the LifecycleWorker class is actually a generic WalkerWorker that can perform a control sub-tree walk for any arbitrary lifecycle stage. It simply captures the control tree root and the lifecycle stage as arguments to its contructor, then uses a new ControlTreeWalker instance to perform a walk on the sub-tree root during the threaded execution.

In one embodiment, the walkRecursivePreRender method is a modified version of ControlTreeWalker.walkRecursive, adding the ability to look for controls that are marked as preRenderForkable and use the ControlTreeWalkerPool to dispatch workers for a subtree. Note that only the first subtree encountered depth-wise is dispatched in a multithreaded manner, meaning that if a sub-tree dispatched in a multithreaded manner also contains a control marked for preRender forking, the inner control will not be executed in an additional thread. However, as long as controls marked for multithreaded preRender aren't descendants of one another, they will be performed in tandem with each other and the main tree walk. At the end of the call to walkRecursivePreRender, the ControlTreeWalker pool is used to wait for the spawned WalkerWorkers to complete their processing before continuing on to the next lifecycle stage.

Multithreaded render is useful in cases where a control's long-running processing requires that the control immediately render into the response. The most common case of this is using a RequestDispatcher to include content that either itself is long-running, or is from an external site. In this case, the implementation is actually composed of three components: a ControlRenderQueue, a class called RenderWorker that extends WalkerWorker, and a modified version of ControlTreeWalker.walkRecursive called walkRecursiveRender. A ControlRenderQueue is used to collect UIControls marked for forkedRender during the pre-render phase, and to collect the render results of those UIControls after they are dispatched to ExecuteThreads. This collection marking phase works similarly to multithreaded preRender qualification, where only the first control depth-wise is collected into the render queue.

During the render lifecycle walk, the render queue is processed before the main control tree is walked. This processing dispatches all of the queued controls to a RenderWorker class so that rendering can take place for each sub-tree in a separate ExecuteRequest. After the processing has been started, the mainline ControlTreeWalker uses the ControlTreeWalkerPool to wait until all worker processing has been completed. In order to allow control rendering to be performed on multiple threads, and to allow this rendering to occur before the mainline render, each RenderWorker creates a BufferedJspContext which is set on the sub-tree it will render. Each BufferedJspContext creates BufferedRequest and BufferedResponse objects that are wrappers for the original HttpServletRequest and HttpServletResponse objects, respectively.

BufferedRequest delegates to the underlying wrapped request, except for access to request attributes, via overrides of the getAttribute, setAttribute and getAttributeNames methods of ServletRequest. Additionally, BufferedRequest implements a method that can be used to transfer the sequence of setAttribute calls back to the original request after all buffered operations are completed. The BufferedRequest is necessary in the netuix framework because communication between various included portions of a portal, such as between the main .portal file and .portlet or .jsp files, is accomplished by setting context instances into request attributes before performing RequestDispatcher includes.

BufferedResponse delegates to the underlying wrapped response, except for operations that affect the response Writer or OutputStream. Calls to getWriter or getOutputStream are instead diverted to instances based on an internal ByteArrayOutputStream that serves to buffer render output from a UIControl. After setting the BufferedJspContext onto a control subtree, the RenderWorker initiates a render walk on the control tree. Each control then uses either the BufferedJspContext and its underlying buffered request and response objects as normal, or simply uses the writer object obtained from the buffered response as normal. The usage of these buffered request and response objects are completely transparent to the rendering controls, and there is no special coding or handling that is required to use the buffered versions. However, the render code should be thread-safe.

Once all RenderWorker processing is complete, the mainline render operation begins. When the ControlTreeWalker worker encounters a control that has been previously rendered by a WalkerWorker, instead of performing the regular render visit on that control, it uses the ControlRenderQueue to obtain the render result for the control, and writes that data into the result.

In one embodiment, look and feel ("L&F") is inherent in an application's GUI. The elements of a GUI that allow a user to functionally interact with it comprise the "feel" of L&F. By way of a non-limiting example, these might be windows, menus, buttons, text fields, etc. The general appearance of these elements comprise the "look" of L&F. By way of a non-limiting example, a look can consist of a button image, the color of a menu, the font in which text is displayed, etc. Thus, a given GUI "feel" may have more than one "look", and vice versa.

In one embodiment, L&F includes three components: a LookAndFeel control, one or more skins, and one or more skeletons. The LookAndFeel control associates a skeleton with a skin (and other configuration attributes). Skins specify superficial information for a GUI element and provide a means for an GUI to embrace different "looks" while retaining the core functionality laid out by the skeleton (which provides the "feel"). A skeleton provides the general appearance and functioning of a GUI element. A skeleton is married to a skin at render time to perfect its "look". In one embodiment, a skeleton includes one or more JSP files. The JSPs that together constitute a given skeleton can be assembled in a directory, the name of which is used to identify the skeleton. References to the skeleton can be made by referencing the containing directory and that directory's path if it differs from a default path (e.g., "/framework/skeletons"). Furthermore, a default skeleton can be provided (e.g., named "default") and located in a default skeleton path. In the absence of skeleton settings to the contrary, the default skeleton in the default location can be assumed by the framework.

In one embodiment, a skeleton can be used to render HTML content. In another embodiment, skeletons can be used to render anything that can be rendered by a JSP. In yet another embodiment, a skeleton can render any of the several forms of XML, either standard or custom (e.g., XHTML, custom XML consumed by Flash MX by Macromedia, etc.). In one embodiment, a skeleton can include a set of JSP files, each of which can be associated with a particular control (sub-classed from PresentationControl) in a control tree.

The PresentationControl superclass provides default rendering using a skeleton in the absence of more explicit rendering. PresentationControl is a superclass for most framework controls, including (but not limited to) the following: Desktop, Shell, Head, Body, Header, Footer, Book, SingleLevelMenu, Page, Layout, Placeholder, Window, Titlebar, and ToggleButton. In one embodiment, for each PresentationControl there is at least one skeleton JSP defined. Situations may arise where a skeleton JSP provided by the chosen skeleton does not meet the needs of a particular instance of a PresentationControl. In this case, the skeleton JSP can be overridden with content from a universal resource identifier ("URI").

In one embodiment, a skeleton JSP's structure is oriented toward control rendering. Like a control, there are both begin and end render states. In the JSP these phases are represented as "beginRender" and "endRender" tags from a JSP render tag library. In general, the contents of these tags are rendered in turn with a control's children rendered in between. However, much finer-grained control can be achieved if desired. Specific children can be retrieved and rendered in explicit locations in order to provide maximum structural layout potential.

FIG. 9 is a sample skeleton JavaServer Page in accordance to an embodiment. In one embodiment, the skeleton can handle the skin portion of the L&F by either hard-coding the appropriate look, or even by providing and using another mechanism of its own. By way of a non-limiting example and with reference to FIG. 9, the "render" taglib is responsible for multiple functions. The "beginRender" and "endRender" sections delimit which code is rendered before child rendering (beginRender) and which code is rendered after child rendering (endRender). Child rendering occurs between the two unless a child is rendered explicitly with the renderChild tag. Here, the renderChild tag is used to render a titlebar child. The titlebar can be retrieved as a PresentationContext, which is a read-only facade over the actual control being rendered. In one embodiment, a PresentationContext exists for each child in the current context, and can be accessed as illustrated in the example JSP.

In one embodiment, skins provide a way to alter the overall look of GUI without modifying it's fundamental functionality. The definition of a skin can depend on how the skeleton or skeletons it expects to be used with are defined. By way of a non-limiting example, if a skeleton is defined to use a particular cascading style sheet (CSS) class, then the skin needs to define a corresponding rule for that class. Skins can be identified by the directory in which they live. References to the skin can be made by referencing the containing directory and that directory's path if it differs from a default path (e.g., "/framework/skins"). Furthermore, a default skin can be provided named "default" and located in the default skin path. In the absence of skin settings to the contrary, the default skin in the default location is assumed by the rendering system.

A skin can be described by a properties file (e.g., a file named "skin.properties") located in the root level of it's containing directory. The properties file can associate the skin with resources. The property images.path can be used to specify a location where skin-related images can be found. Subdirectories of this directory can be used to store alternate image sets for use by themes. In one embodiment, this property is optional and defaults to the value "images". For example, a properties file might include the following definition:

images.path: images

A link entries section of the properties file can be used to configure link entries, such as CSS references. Such entries are generally HTML-oriented, but could be used by an alternate rendering scheme (e.g. XML) in a way parallel to that described herein. Property entries for this section essentially encapsulate an HTML "link" tag. In one embodiment, this can be accomplished as follows:

(1) All entries for this section begin with the property prefix "link" to scope them as describing link tags
(2) A short name is used to group properties related to a single tag name
(3) Together, (1) and (2) define a link tag to be generated
(4) Finally, the base property prefix formed by the union of (1) and (2) is used to define attributes to be set for the given link tag by appending a value for any valid HTML link tag attribute (e.g., charset, href, hreflang, type, rel, media, etc.)
(5) The union of (1)-(4) yields a complete property name usable in this section; as long as at least one attribute is specified with a value in a given link group An "index" link attribute can be included. This attribute is not rendered in the HTML output, but is instead used to determine the order of the output with respect to link tags representing other property groups. In one embodiment, the index attribute can be any integer value. Rendering of indexed property groups will occur in ascending order, with any remaining, un-indexed groups being rendered last in an arbitrary order relative to one another. This attribute is optional.

For example, these properties:

| | |
|---|---|
| link.document.href: | css/document.css |
| link.document.rel: | stylesheet |
| link.document.media: | screen |
| link.document.index: | 2 |
| link.input.href: | css/input.css |
| link.input.rel: | stylesheet |
| link.input.media: | screen |
| link.input.index: | 1 |

. . . can generate the following HTML:

```
<link href="{qualified skin path}/css/input.css"
    rel="stylesheet" media="screen"/>
<link href="{qualified skin path}/css/document.css"
    rel="stylesheet" media="screen"/>
```

In one embodiment, script entries can be placed in a "script entries" section. This section can be used to configure script entries, such as JavaScript references. Property entries for this section essentially encapsulate an HTML script. By way of a non-limiting example, this can be accomplished as follows:

(1) Entries for this section can begin with the property prefix "script" to scope them as describing script tags.
(2) A short name can be used to group properties related to a single tag name.
(3) Together, (1) and (2) define a script tag to be generated.
(4) Finally, the base property prefix formed by the union of (1) and (2) can be used to define attributes to be set for the given script tag by appending a value for any valid HTML script tag attribute (e.g., carset, type, src, defer, etc.).
(5) The union of (1)-(4) yields a complete property name usable in this section; as long as at least one attribute is specified with a value in a given script group An "index" script attribute can be included. This attribute is not rendered in the HTML output, but is instead used to determine the order of the output with respect to script tags representing other property groups. The index value can be any integer value. Rendering of indexed property groups will occur in ascending order, with any remaining, unindexed groups being rendered last in an arbitrary order relative to one another. This attribute is optional.

For example, these properties:

```
script.skin.src:      js/skin.js
script.skin.type:     text/javascript
script.skin.index:    2
script.util.src:      js/util.js
script.util.type:     text/javascript
script.util.index:    1
```

... can generate this HTML:

```
<script src="{qualified skin path}/js/util.js"
    type="text/javascript"></script>
<script src="{qualified skin path}/js/skin.js"
    type="text/javascript"></script>
```

Script hrefs can be defined relative to the "skin.properties" file.

In one embodiment, the properties document.body.onload and document.body.onunload allow a skin to associate a "body" tag's "onload" and "onunload" with event handlers. Doing so will cause the value of either property to be inserted into the beginning of the appropriate event handler's command list before rendering. The end result is the evaluation of said property value after the document has been completely loaded, allowing skin scripts to apply themselves to the document. Typically, the values of these properties are script function calls defined in one of the script declarations from the previous section. For example, this property:

```
document.body.onload: addSkinEventHandlers( )
```

... will generate this HTML:

```
<body onload="addSkinEventHandlers( );">
```

If a skin was written to be used specifically with a particular skeleton implementation, the properties default.skeleton.id and default.skeleton.path can be set to specify that skeleton. In the absence of skeleton or skeletonPath attributes of the L&F control the values of these properties is used instead of the catch-all default skeleton and skeletonPath. The path property can be defined relative to the webapp.

Metadata can be predefined by setting the property enable.meta.info. A common use for this data is as a convenience for testing or debugging. For example, adding information about the look and feel in use can aid in test development in that the tests can identify the document style being handled and can adjust it's testing methodologies or reporting as appropriate. In one embodiment, this data manifests in HTML as a series of <meta/> tags located in the document head. Absence of this property or any value other than "true" will yield a false setting, which will mute the output of such meta info.

The resources provided by the skin define what it is, though it's the skeleton and the skin.properties file that bring form to those resources, making them tangible. A skin can consist of any number of resources, and of any type that the target skeleton(s) can take advantage of. The following is a list of several of the most common types, and some notes about their manifestation as elements of a skin.

In one embodiment, a web application can have an images directory associated with it via the Look and Feel, whether or not the images property was specified in the skin.properties file. Of course, if the skeleton never references any images, then no images are used. The images directory can also be set to be equal to the skin directory itself, which is done by setting the skin.properties property images.path to the empty string.

The following set of images are well-known and, while not strictly required, are typically provided by most skins (since most skeletons make use of them). Additional images can be required depending on the requirements of the target skeleton and whether the skin itself defines any of its own images, perhaps via CSS or JavaScript.

```
titlebar-button-config.gif
titlebar-button-config-exit.gif
titlebar-button-delete.gif
titlebar-button-edit.gif
titlebar-button-edit-exit.gif
titlebar-button-help.gif
titlebar-button-help-exit.gif
titlebar-button-maximize.gif
titlebar-button-unmaximize.gif
titlebar-button-minimize.gif
titlebar-button-unminimize.gif
```

Another component of modern Web sites is the Cascading Style Sheet. Skins are able to strongly leverage their decoupling from skeletons by putting CSS to work. While not required, CSS can be the meat and potatoes of making a skin work. Of course, they won't work gracefully just because the skin wants them to—the skin's target skeleton(s) will need to provide the appropriate hooks (typically in the form of id and class declarations) for them to be maximally effective.

Note, too, that some skeletons allow control-overridden CSS styles and classes via the control declaration in a web application source file. Either situation can cause rendering anomalies (which is usually the purpose of the overrides) that affect the Look and Feel's appearance. Look for this if incorrect rendering behavior seems to appear in the web application.

Scripts can be a powerful ally for client-side dynamic behaviors. Typically manifesting as JavaScript or another ECMAScript-compliant language, client-side scripting can be bootstrapped from the web application's skin. Great amounts of additional interactivity can be added, with or without the help of the underlying skeleton code. For instance, using the skin.properties property document.body.onload and a script declaration one can initialize an entire document to suit a particular purpose or purposes. Suppose it was desired that all well-defined buttons found in window titlebars had a simple rollover effect achieved by swapping images during mouse overs. The following example code makes that simple, and it can all be specified from the skin itself.

For the example, assume that the standard set of images exist in the skin, along with a new version of each named with the indicator "-active" right before the image file extension, as the next example illustrates:

titlebar-button-config.gif
titlebar-button-config-active.gif

Themes can be defined and implemented across skeletons and skins to provide variations of either in explicitly defined contexts. Explicit portions of a GUI can take direct control over the L&F of a rendered region and work within or step outside of the L&F framework described herein; this is accomplished by overriding skeleton infrastructure for particular elements (controls). A theme is a construct that allows subgroups of a portal instance to use different virtual look and feels than the main rendering area. Themes can be useful for creating specialized areas of the portal that would otherwise complicate the baseline look and feel development unnecessarily.

For a skin to be useful to a given skeleton (since skins are typically written for particular skeletons) in the context of a particular theme, the skin can support the same set of themes as the skeleton it naturally targets. In one embodiment, given the name of a theme, the LookAndFeel control searches for theme skeleton components in the directory derived by combining the base directory of the skeleton and the name of the theme. Skin theme image resolution works the same way, only using the configured images directory for the skin as the base location.

In the skeleton case, themes manifest as sets of skeleton JSPs in their theme subdirectory as described above. The sets can be complete sets or subsets of the base JSP set for the skeleton. In the case of subsets, no upward resolution is performed if a theme's skeleton JSP is missing—this is an error condition. Any JSP in the theme set is simply a variation on the base skeleton and is used instead of the base skeleton JSP when the theme's scope is in effect.

A Theme control manifests as a wrapper around other controls and entities. By applying a theme in this way, the theme's children are rendered with the skeleton and skins resources defined by the enveloping theme. The following attributes are particularly noteworthy elements of theme control: "name", "usingAltSkeleton", and "usingAltImages". The "name" attribute is already well known—it defines the unique id as well as the skeleton and skin images subdirectories used when resolving a theme context.

The "usingAltSkeleton" attribute is a boolean switch; a value of "false" indicates that the Look and Feel should not try to use skeleton JSPs from a subdirectory of the base skeleton directory—it should instead use the default skeleton JSPs. A value of "false" can be useful when only the skin side of the theme is of interest to the region of code being themed. The default value is "true".

The "usingAltImages" attribute is a boolean switch as well; a value of "false" indicates that image resources should not be pulled from the theme-defined subdirectory of the skin images directory, but should instead be pulled from the normal images area. A value of "false" can be useful when only the skeleton side of the theme is of interest to the region being themed. The default value is again "true".

EXAMPLE

```
<netuix:theme name="MyTheme" usingAltSkeleton="false">
    <netuix:window ...>
        ...
    </netuix:window>
</netuix:theme>
```

In this simple case, the enveloped window control instance would be rendered with the skeleton and skin resources identified by the theme named "MyTheme".

The crux of the concepts, implementations, and controls discussed so far is the LookAndFeel control. The LookAndFeel control has the following attributes in one embodiment:
  skeleton
  skeletonPath
  skin
  skinPath
  defaultWindowIcon
  defaultWindowIconPath In one embodiment, a user can customize (or personalize) a web application to suit their needs. A template is a definition of a web application and can reside in a library. Changes made to a template can be propagated to portlet instances, at the discretion of the administrator. Streaming control trees allow for personalized representations of requests. For example, a page can contain only portlets (controls trees) that the user has selected or that entitlement rules have selected for the user. Each user may select different sets of portlets. A streaming control tree factory can map each user into an individual control stream and then construct a control tree from it. The streaming control tree factory hides all the details about how the control tree is generated and how personalization occurs. The control tree representation may be cached and may be regenerated if the stream changes. For example, if a user selects a different set of portlets to be visible.

In one embodiment, a user's attributes (e.g., name, age, position, etc.) and/or group membership can be used to automatically choose a L&F. By way of a non-limiting example, when a user first visits a portal, the user is considered an anonymous visitor and thus will see a default L&F for the portal. Once a user logs into the portal, a L&F can be automatically applied to the portal based on the user's characteristics or other information (e.g., time of day, external data, etc.).

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations is apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

The invention claimed is:

1. A method for building a representation of a graphical user interface (GUI), comprising:
   generating a representation of the GUI from metadata, wherein the representation includes at least one control, wherein the at least one control has an interchangeable persistence mechanism;
   driving the representation through at least one lifecycle stage by an interchangeable lifecycle component;
   wherein the metadata can include at least one of: hierarchical relationships among controls, control properties, and control event information;
   wherein the representation can be driven through the at least one lifecycle stage by an interchangeable lifecycle component;
   wherein an interface is provided to isolate details of the interchangeable lifecycle component from a control container to allow different lifecycle implementations to be interchangeable, the interchangeable lifecycle component further drives a control tree through different lifecycle stages, the control tree includes portal controls, desktop controls, page controls and portlet controls;
   wherein the at least one control can advance through the at least one lifecycle stage in parallel with another control;
   wherein the interchangeable life cycle component runs on at least one processor; and
   wherein the life cycle stages include an "Init" stage that allows a control to perform initialization, a "Load State" stage that loads previously saved state from a request, a "Create Child Controls" stage that creates any child controls, a "Load" stage that obtains any external resources necessary for processing the request, a "Raise Events" stage that is a two phase stage where controls first indicate they want to raise events and then all controls who indicated this are allowed to raise events, a "Pre-render" stage that is the final stage before the rendering stages, a "Save State" stage in which all controls that want to save their states are given the opportunity to do so, a "Render" stage that is the stage where controls create their GUI representations and control how any children are rendered, a "Unload" stage that allows the control to free resources, and "Dispose" stage that does any final cleanup.

2. The method of claim 1, further comprising:
creating the metadata by parsing a file.

3. The method of claim 1 wherein:
the step of generating the metadata representation occurs as a result of receiving a request.

4. The method of claim 3 wherein:
the request is a hypertext transfer protocol request (HTTP); and wherein the request originates from a web browser.

5. The method of claim 1, further comprising:
providing a response to a web browser.

6. The method of claim 1 wherein:
the at least one control can render itself according to a theme.

7. The method of claim 1 wherein:
one of the at least one controls can interact with another of the at least one controls.

8. The method of claim 5 wherein:
the response is a hypertext transfer protocol (HTTP) response.

9. The method of claim 1 wherein:
controls can raise events and respond to events.

10. The method of claim 1 wherein:
the at least one control can be one of: Book, Page, Window, Menu, Layout, Portlet, Theme, Placeholder, Shell, LookAndFeel, Desktop, Body, Footer, Header, Head, Titlebar, ToggleButton, TreeView, TreeViewWithRadioButtons.

11. A system for building a representation of a graphical user interface (GUI), comprising:
   a first component operable to produce a second component and a metadata representation of the GUI;
   the second component operable to produce a hierarchical representation of the GUI based on the metadata, wherein the representation includes at least one control, wherein the at least one control has an interchangeable persistence mechanism;
   wherein the metadata can include at least one of: hierarchical relationships among controls, control properties, and control event information;
   wherein the representation can be driven through at least one lifecycle stage by an interchangeable lifecycle component;
   wherein an interface is provided to isolate details of the interchangeable lifecycle component from a control container to allow different lifecycle implementations to be interchangeable;
   wherein the interchangeable lifecycle component further drives a control tree through different lifecycle stages, the control tree includes portal controls, desktop controls, page controls and portlet controls;
   wherein the at least one control can advance through the at least one lifecycle stage in parallel with another control;
   wherein the interchangeable life cycle component runs on at least one processor; and
   wherein the life cycle stages include an "Init" stage that allows a control to perform initialization, a "Load State" stage that loads previously saved state from a request, a "Create Child Controls" stage that creates any child controls, a "Load" stage that obtains any external resources necessary for processing the request, a "Raise Events" stage that is a two phase stage where controls first indicate they want to raise events and then all controls who indicated this are allowed to raise events, a "Pre-render" stage that is the final stage before the rendering stages, a "Save State" stage in which all controls that want to save their states are given the opportunity to do so, a "Render" stage that is the stage where controls create their GUI representations and control how any children are rendered, a "Unload" stage that allows the control to free resources, and "Dispose" stage that does any final cleanup.

12. The system of claim 11, further comprising:
a parser operable to parse a file and create the metadata.

13. The system of claim 12 wherein:
the file is a JavaServer Pages (JSP) file.

14. The system of claim 11 wherein:
a first generator produces a second generator in response to receiving a request.

15. The system of claim 14 wherein:
the request is a hypertext transfer protocol request (HTTP); and
wherein the request originates from a web browser.

16. The system of claim 11 wherein:
a response is provided to a web browser.

17. The system of claim 11 wherein:
the at least one control can render itself according to a theme.

18. The system of claim 11 wherein:
one of the at least one controls can interact with another of the at least one controls.

19. The system of claim 16 wherein:
the response is a hypertext transfer protocol (HTTP) response.

20. The system of claim 11 wherein:
the at least one control can raise events and respond to events.

21. The system of claim 11 wherein:
the at least one control can be one of: Book, Page, Window, Menu, Layout, Portlet, Theme, Placeholder, Shell, LookAndFeel, Desktop, Body, Footer, Header, Head, Titlebar, ToggleButton, TreeView, TreeViewWithRadioButtons.

22. A system comprising:
a means for generating a first representation of a graphical user interface (GUI);
a means for generating a second representation of the GUI from the first representation, wherein the second representation includes at least one control, wherein the at least one control has an interchangeable persistence mechanism;
wherein metadata can include at least one of hierarchical relationships among controls, control properties, and control event information;
wherein the second representation can be driven through at least one lifecycle stage by an interchangeable lifecycle component;
wherein an interface is provided to isolate details of the interchangeable lifecycle component from a control container to allow different lifecycle implementations to be interchangeable;
wherein the interchangeable lifecycle component further drives a control tree through different lifecycle stages, the control tree includes portal controls, desktop controls, page controls and portlet controls;
wherein the at least one control can advance through the at least one lifecycle stage in parallel with another control;
wherein the interchangeable life cycle component runs on at least one processor; and
wherein the life cycle stages include an "Init" stage that allows a control to perform initialization, a "Load State" stage that loads previously saved state from a request, a "Create Child Controls" stage that creates any child controls, a "Load" stage that obtains any external resources necessary for processing the request, a "Raise Events" stage that is a two phase stage where controls first indicate they want to raise events and then all controls who indicated this are allowed to raise events, a "Pre-render" stage that is the final stage before the rendering stages, a "Save State" stage in which all controls that want to save their states are given the opportunity to do so, a "Render" stage that is the stage where controls create their GUI representations and control how any children are rendered, a "Unload" stage that allows the control to free resources, and "Dispose" stage that does any final cleanup.

23. The system of claim 22, further comprising:
a means for parsing a file and creating the metadata.

24. The system of claim 23 wherein:
the file is a JavaServer Pages (JSP) file.

25. The system of claim 22, further comprising:
the means for accepting a request.

26. The system of claim 25 wherein:
the request is a hypertext transfer protocol request (HTTP); and
wherein the request originates from a web browser.

27. The system of claim 22, further comprising:
a means to provide a response to a web browser.

28. The system of claim 22 wherein:
the at least one control can render itself according to a theme.

29. The system of claim 22 wherein:
one of the at least one controls can interact with another of the at least one controls.

30. The system of claim 27 wherein:
the response is a hypertext transfer protocol (HTTP) response.

31. The system of claim 22 wherein:
the at least one control can raise events and respond to events.

32. The system of claim 22 wherein:
the at least one control can be one of: Book, Page, Window, Menu, Layout, Portlet, Theme, Placeholder, Shell, LookAndFeel, Desktop, Body, Footer, Header, Head, Titlebar, ToggleButton, TreeView, TreeViewWithRadioButtons.

33. A machine readable storage medium having instructions stored thereon that when executed by a processor cause a system to:
generate a representation of a graphical user interface (GUI) from metadata, wherein the representation includes at least one control, wherein the at least one control has an interchangeable persistence mechanism;
drive the representation through at least one lifecycle stage by an interchangeable lifecycle component;
wherein the metadata can include at least one of: hierarchical relationships among controls, control properties, and control event information;
wherein the representation can be driven through the at least one lifecycle stage by the interchangeable lifecycle component;
wherein an interface is provided to isolate details of the interchangeable lifecycle component from a control container to allow different lifecycle implementations to be interchangeable;
wherein the interchangeable lifecycle component further drives a control tree through different lifecycle stages, the control tree includes portal controls, desktop controls, page controls and portlet controls;
wherein the at least one control can advance through the at least one lifecycle stage in parallel with another control;

wherein the interchangeable life cycle component runs on at least one processor; and wherein the life cycle stages include an "Init" stage that allows a control to perform initialization, a "Load State" stage that loads previously saved state from a request, a "Create Child Controls" stage that creates any child controls, a "Load" stage that obtains any external resources necessary for processing the request, a "Raise Events" stage that is a two phase stage where controls first indicate they want to raise events and then all controls who indicated this are allowed to raise events, a "Pre-render" stage that is the final stage before the rendering stages, a "Save State" stage in which all controls that want to save their states are given the opportunity to do so, a "Render" stage that is the stage where controls create their GUI representations and control how any children are rendered, a "Unload" stage that allows the control to free resources, and "Dispose"stage that does any final cleanup.

34. The machine readable medium of claim 33, further comprising instructions that when executed cause the system to:

create the metadata by parsing a file.

35. The machine readable medium of claim 33 wherein: the step of generating the metadata representation occurs as a result of receiving a request.

36. The machine readable medium of claim 35 wherein: the request is a hypertext transfer protocol request (HTTP); and wherein the request originates from a web browser.

37. The machine readable medium of claim 33, further comprising instructions that when executed cause the system to:

provide a response to a web browser.

38. The machine readable medium of claim 33 wherein: the at least one control can render itself according to a theme.

39. The machine readable medium of claim 33 wherein: one of the at least one controls can interact with another of the at least one controls.

40. The machine readable medium of claim 37 wherein: the response is a hypertext transfer protocol (HTTP) response.

41. The machine readable medium of claim 33 wherein: controls can raise events and respond to events.

42. The machine readable medium of claim 33 wherein: the at least one control can be one of: Book, Page, Window, Menu, Layout, Portlet, Theme, Placeholder, Shell, LookAndFeel, Desktop, Body, Footer, Header, Head, Titlebar, ToggleButton, TreeView, TreeViewWithRadioButtons.

* * * * *

UNITED STATES PATENT AND TRADEMARK OFFICE
CERTIFICATE OF CORRECTION

PATENT NO. : 7,647,564 B2  Page 1 of 1
APPLICATION NO. : 10/789140
DATED : January 12, 2010
INVENTOR(S) : Daryl B. Olander et al.

It is certified that error appears in the above-identified patent and that said Letters Patent is hereby corrected as shown below:

On the Title Page, Item (*) Notice: delete "by 354 days" insert -- by 601 days --.

On the Title Page, Item (56), on page 2, under "Other Publications", line 11, before "10 pages" insert -- 2006 --.

On sheet 8 of 9, in Figure 8, line 4, delete "Porlet" and insert -- Portlet --, therefor.

In column 1, line 51, delete "at.," and insert -- al., --, therefor.

In column 7-8, line 4-5, delete "and or" and insert -- and/or --, therefor.

In column 11, line 9, delete "jspservice" and insert -- jspService --, therefor.

In column 15, line 10, delete "contructor," and insert -- constructor, --, therefor.

In column 20, line 45, delete "anomolies" and insert -- anomalies --, therefor.

In column 27, line 18, in claim 33, delete ""Dispose"stage" and insert -- "Dispose" stage --, therefor.

Signed and Sealed this

Fourteenth Day of September, 2010

David J. Kappos
*Director of the United States Patent and Trademark Office*